(12) United States Patent
Gao

(10) Patent No.: US 9,959,442 B2
(45) Date of Patent: May 1, 2018

(54) EXTENDED DEPTH OF FIELD IN IMAGING MACHINE-READABLE SYMBOL READER USING IMAGE SIDE TELECENTRIC LENS

(71) Applicant: Datalogic ADC, Inc., Eugene, OR (US)

(72) Inventor: WenLiang Gao, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 330 days.

(21) Appl. No.: 14/292,228

(22) Filed: May 30, 2014

(65) Prior Publication Data
US 2015/0347799 A1     Dec. 3, 2015

(51) Int. Cl.
*G06K 7/10*     (2006.01)

(52) U.S. Cl.
CPC ..... *G06K 7/10831* (2013.01); *G06K 7/10801* (2013.01); *G06K 7/10841* (2013.01)

(58) Field of Classification Search
USPC .......................................................... 235/454
See application file for complete search history.

(56) References Cited

U.S. PATENT DOCUMENTS

| | | | | |
|---|---|---|---|---|
| 4,063,814 A | * | 12/1977 | Rhodes | G01S 17/50 250/204 |
| 5,457,550 A | * | 10/1995 | Baba | G02B 26/106 359/18 |
| 5,532,771 A | * | 7/1996 | Johnson | A61B 3/14 351/205 |
| 5,682,030 A | | 10/1997 | Kubon | |
| 5,745,176 A | | 4/1998 | Lebens | |
| 6,980,249 B2 | | 12/2005 | Albertelli | |
| 7,490,770 B2 | | 2/2009 | Shearin | |
| 7,516,899 B2 | * | 4/2009 | Laser | G06K 7/12 235/454 |
| 7,712,667 B2 | | 5/2010 | Laser | |
| 8,384,905 B2 | | 2/2013 | Wu | |
| 8,632,011 B2 | | 1/2014 | Gao | |
| 2012/0018516 A1 | | 1/2012 | Gao et al. | |
| 2013/0206839 A1 | | 8/2013 | Gao | |
| 2013/0301088 A1 | | 11/2013 | Smith | |

FOREIGN PATENT DOCUMENTS

GB     2 444 966 A     6/2008

* cited by examiner

*Primary Examiner* — Rafferty Kelly
(74) *Attorney, Agent, or Firm* — Seed IP Law Group LLP

(57) ABSTRACT

Systems and methods for providing multiple image fields or regions on a single, two-dimensional imaging sensor array of a data reader. A single sensor array may be divided into two or more imaging regions each of which may be used to render a separate view of an overall read volume. An image-side telecentric optical system may be utilized to divide the sensor array into the two or more imaging regions. A thin, high refractive index focal element (e.g., optical glass) may be positioned over at least one of the two or more imaging regions to provide multiple focus positions using a single telecentric optical system and a single sensor array. The multiple imaging regions may be used to capture images from different regions, and/or may be used produce a longer depth of field by combining overlapping depths of field of the multiple imaging regions.

34 Claims, 8 Drawing Sheets

EXTENDED DEPTH OF FIELD IN IMAGING MACHINE-READABLE SYMBOL READER USING IMAGE SIDE TELECENTRIC LENS

BACKGROUND

Technical Field

The present disclosure relates to readers to read machine-readable symbols.

Description of the Related Art

Machine-readable symbols encode information in a form that can be optically read via an appropriately configured machine-readable symbol reader or scanner. Machine-readable symbols take a variety of forms, the most commonly recognized form being the linear or one-dimension barcode symbol. Other forms include two-dimensional machine-readable symbols such as stacked code symbols, and area or matrix code symbols. These machine-readable symbols are typically composed on patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a data reader to allow the customer to redeem a coupon or to verify that the customer has purchased a ticket for the event.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal having an amplitude determined by the intensity of the collected light. Relatively less reflective or darker regions (e.g., bars or other marks) may, for example, be characterized or represented in the electrical signal by an amplitude below a threshold amplitude, while relatively more reflective or lighter regions (e.g., white spaces) may be characterized or represented in the electrical signal an amplitude above the threshold amplitude. When the machine-readable symbol is imaged, positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

In machine-readable symbol readers, a return light signal from the object or symbol being read is focused onto a sensor or sensor array. In the example of a machine-readable symbol reader reading marks and spaces of a typical machine-readable symbol, there needs to be sufficient difference in signal intensity between the signal corresponding to the light space and the signal corresponding to the dark bar in order for the processor to differentiate therebetween. Depth of field plays an important role in effectively detecting an image at the sensor. Thus in machine-readable symbol reading applications there has been demand for increased depth of field, i.e., the range of distance over which the machine-readable symbol reader can effectively scan.

In order to provide a longer depth of field, changing the focus of a lens is possible by mechanical means, such as by utilizing a voice coil motor or a stepper motor, or by utilizing electro-optical means such as a voltage controlled liquid lens. However, these methods have disadvantages including added moving parts which affect reliability, added drive circuitry which increases complexity and cost, and the inability to provide multiple focus settings at the same time using a single sensor array.

BRIEF SUMMARY

A machine-readable symbol reader may be summarized as including: a two-dimensional sensor array having a first imaging region to acquire a first two dimensional image of a first read volume and a second imaging region to acquire a second two dimensional image of a second read volume, the second read volume different than the first read volume; an optical system optically aligned with the sensor array along an optical axis to direct light rays reflected from an object toward the sensor array, the optical system is telecentric on a side thereof proximate the sensor array and which provides principal rays at the sensor array from the optical system normal to the sensor array; and a focal element disposed between the optical system and the sensor array to direct at least some of the rays at the sensor array through the focal element, the focal element produces a first image focus distance for rays detected by the first imaging region of the sensor array, the first image focus distance different from a second image focus distance for rays detected by the second imaging region of the sensor array.

The focal element may include a plate of optical glass disposed between the optical system and the sensor array. The plate of optical glass may be positioned such that only rays detected by the first imaging region of the sensor array pass through the plate of optical glass. The plate of optical glass may have a refractive index of between 1.3 and 3.0. The plate of optical glass may have a thickness of less than one millimeter. The plate of optical glass may have a thickness of less than or equal to 0.5 millimeters. The focal element may be affixed to the sensor array and may cover at least the first imaging region of the sensor array. The first imaging region of the sensor array may have a first two-dimensional area and the second imaging region of the sensor array may have a second two-dimensional area, the second two-dimensional area being equal in size to the first two-dimensional area. The first imaging region of the sensor array may have a first two-dimensional area and the second imaging region of the sensor array may have a second two-dimensional area, the second two-dimensional area different in size from the first two-dimensional area.

The machine-readable symbol may further include one or more fixed light reflective surfaces optically associated with the optical system, the one or more fixed light reflective surfaces direct light from the first read volume along a first path to the optical system and the first imaging region of the sensor array, and direct light from the second read volume along a second path to the optical system and the second imaging region of the sensor array.

At least a portion of the first read volume and at least a portion of the second read volume may overlap each other to form an overlapping read volume. The first read volume and the second read volume may not overlap each other. The first image focus distance for the first read volume may have an associated first depth of field and the second image focus distance for the second read volume may have an associated second depth of field, the first depth of field overlaps with the second depth of field to provide an overlapping depth of field for the machine-readable symbol reader greater than the first depth of field and the second depth of field. The sensor array may define a third imaging region for acquiring a third two dimensional image of a third read volume, and the focal element may produce a third image focus distance for rays detected by the third imaging region of the sensor array, the third image focus distance different from the first image focus distance and the second image focus distance. The focal element may have a first thickness at a first portion thereof that passes rays to the first imaging region and a second thickness at a second portion thereof that passes rays to the second imaging region. The focal element may be a fixed element and may include a first optical glass having a first thickness and a second optical glass having a second thickness. The sensor array may include one of a charge-coupled device (CCD) sensor array or complementary metal-oxide-semiconductor (CMOS) sensor array.

A method of reading data from a machine-readable symbol by imaging may be summarized as including: positioning a two-dimensional sensor array in optical alignment with an optical system such that rays passing through the optical system arrive at the sensor array, the optical system telecentric on a side proximate the sensor array whereby principal rays arrive at the sensor array from the optical system substantially normal to the sensor array; and positioning a focal element between the sensor array and the optical system such that at least some of the rays arrive at the sensor array from the optical system through the focal element, the focal element produces a first image focus distance for rays detected by a first imaging region of the sensor array, the first image focus distance different from a second image focus distance for rays detected by a second imaging region of the sensor array.

The method of reading data from a machine-readable symbol by imaging may further include capturing light reflected from the machine-readable symbol by the sensor array.

Positioning a focal element may include positioning a plate of optical glass between the optical system and the sensor array. Positioning a focal element may include positioning a plate of optical glass over the first imaging region such that only rays detected by the first imaging region of the sensor array pass through the plate of optical glass. Positioning a focal element may include positioning a plate of optical glass between the optical system and the sensor array, and the plate of optical glass may have a refractive index of between 1.3 and 3.0. Positioning a focal element may include positioning a plate of optical glass between the optical system and the sensor array, and the plate of optical glass may have a thickness of less than one millimeter. Positioning a focal element may include positioning a plate of optical glass between the optical system and the sensor array, and the plate of optical glass may have a thickness of less than or equal to 0.5 millimeters.

The method of reading data from a machine-readable symbol by imaging may further include affixing the focal element to the sensor array to cover at least the first imaging region of the sensor array.

Positioning a focal element may include positioning a focal element over the first imaging region of the sensor array, and the first imaging region of the sensor array and the second imaging region of the sensor array may have the same two-dimensional area. Positioning a focal element may include positioning a focal element over the first imaging region of the sensor array, and the first imaging region of the sensor array and the second imaging region of the sensor array may have different two-dimensional areas.

The method of reading data from a machine-readable symbol by imaging may further include positioning one or more fixed light reflecting surfaces in optical alignment with the optical system to direct light from a first read volume along a first path to the optical system and the first imaging region of the sensor array, and to direct light from a second read volume along a second path to the optical system and the second imaging region of the sensor array.

Positioning one or more fixed light reflecting surfaces may include positioning one or more fixed light reflecting surfaces in optical alignment with the optical system to direct light from a first read volume along a first path to the optical system and the first imaging region of the sensor array, and to direct light from a second read volume along a second path to the optical system and the second imaging region of the sensor array, at least a portion of the first read volume and at least a portion of the second read volume overlap each other to form an overlapping read volume. Positioning a focal element may include producing the first image focus distance and second image focus distance, and the first image focus distance may have an associated first depth of field and the second image focus distance may have an associated second depth of field, the first depth of field overlaps with the second depth of field to provide an overlapping depth of field greater than the first depth of field and the second depth of field. Positioning a focal element may include positioning a focal element between the sensor array and the optical system such that at least some of the rays arrive at the sensor array from the optical system through the focal element, the focal element produces a third image focus distance for rays detected by a third imaging region of the sensor array, the third image focus distance different from the first image focus distance and the second image focus distance. Positioning a two-dimensional sensor array may include positioning a two-dimensional sensor array that includes one of a charge-coupled device (CCD) sensor array or complementary metal-oxide-semiconductor (CMOS) sensor array.

A machine-readable symbol reader may be summarized as including: a sensor array; an image-side telecentric lens assembly optically aligned with the sensor array along an optical axis to direct light rays reflected from an object toward the sensor array; and a focal element disposed between the image-side telecentric lens assembly and the sensor array such that at least some of the light rays from the image-side telecentric lens assembly arrive at the sensor array through the focal element and at least some of the light rays from the image-side telecentric lens assembly arrive at the sensor array without passing through the focal element.

The focal element may include a plate of optical glass. The focal element may have a thickness of less than one millimeter and an index of refraction greater than 1.3.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
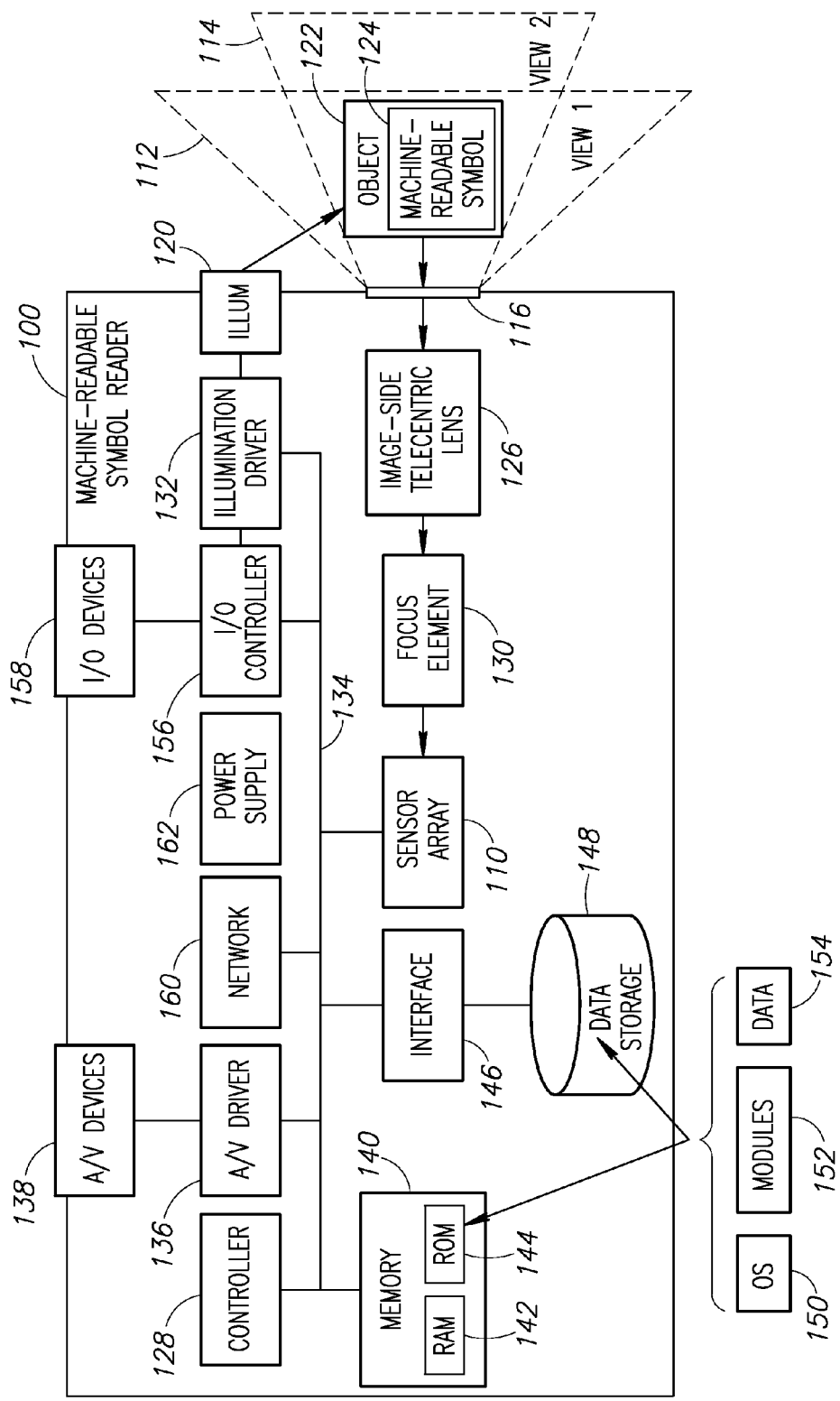
FIG. 1 is a block diagram of a machine-readable symbol reader and an object bearing a machine-readable symbol to be read, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with machine-readable symbol readers or other imager or imaging systems have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Disclosed herein are embodiments of methods and systems for improving the performance of imaging scanners or machine-readable symbol readers by providing multiple image fields or regions on a single imaging sensor array. The single sensor array may be divided into two or more imaging regions each of which may be used to render a separate view of a read volume. An image-side telecentric optical system may be utilized to provide different, substantially parallel or close to parallel optical paths that are directed to different regions of the sensor array, effectively partitioning the sensor array into the two or more imaging regions. In some embodiments, a thin lens or focal element (e.g., optical glass) having a relatively high index of refraction may be positioned over at least one of the two or more imaging regions to provide multiple focus positions using a single image-side telecentric optical system and a single sensor array. The multiple imaging regions may be used to capture images at different read volumes using a single lens assembly and a single sensor array, may be used produce a longer depth of field by combining overlapping depths of field of the multiple imaging regions, or may be used to produce the same depth of field with lower f# lens which means less illumination is required (e.g., less illumination sources are needed).

FIG. 1 is a block diagram of a machine-readable symbol reader 100, according to one embodiment. The machine-readable symbol reader 100 includes an image sensor or sensor array 110, which simultaneously captures images of fields of view 112 and 114 through a window 116. In one embodiment, the fields of view 112 and 114 are focused onto the sensor array 110 and the fields of view 112 and 114 do not overlap. In other embodiments, however, the fields of view 112 and 114 overlap each other. Regardless of the degree of overlap (or no overlap), image frames captured by the sensor array 110 may include light emanating from the fields of view 112 and 114.

As discussed in further detail below, by dividing the sensor array 110 into multiple imaging regions (e.g., half of the sensor array 110 dedicated to capturing the field of view 112 and the other half of the sensor array 110 dedicated to capturing the field of view 114), the machine-readable symbol reader 100 can utilize all or most of the imaging surface of the sensor array 110 to capture images of multiple fields of view concurrently. In other words, a single sensor array can be used to capture multiple whole views without the use of moving parts, such as a mechanical shutter that blocks one view while an image of the other view is being captured or a movable mirror that switches between projecting the different fields of view onto the sensor array.

FIG. 1 also illustrates an item or object 122 positioned within the fields of view 112 and 114. The object 122 includes a machine-readable symbol 124 (e.g., PDF417, Code 128, etc.) that is to be detected and/or decoded by the machine-readable symbol reader 100.

The machine-readable symbol reader 100 includes an image-side telecentric lens assembly 126 positioned and oriented to focus light onto the sensor array 110. For example, the lens assembly 126 may comprise an array of optical elements with a common axis. The lens assembly 126 may also comprise a zoom lens coupled to a controller 128 (discussed below) to control an amount of optical zoom. In some embodiments, a 20×-40× amount of optical zoom is provided.

Figure 8:
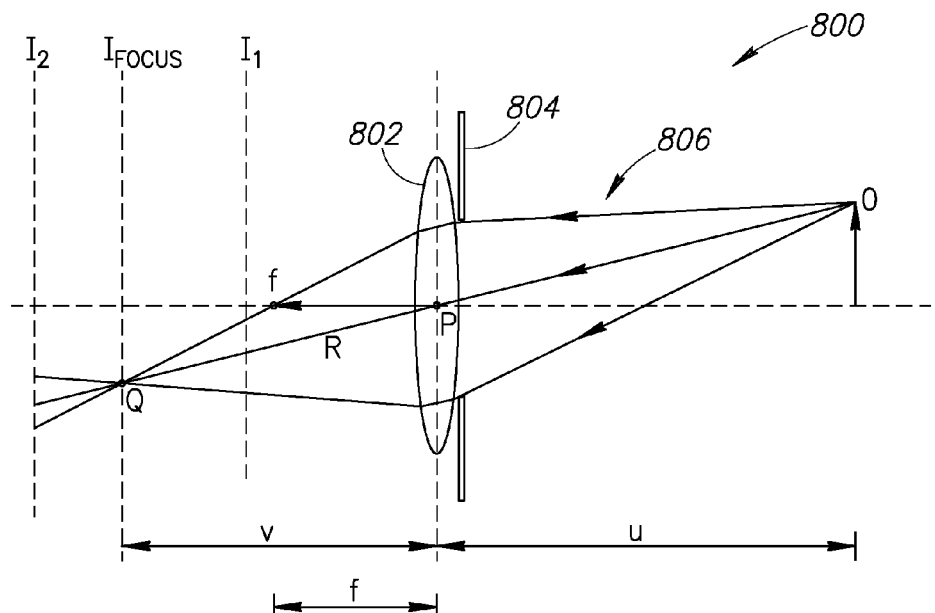
FIG. 8 is a schematic diagram illustrating operation of a conventional lens model, according to at least one illustrated embodiment.
Figure 9:
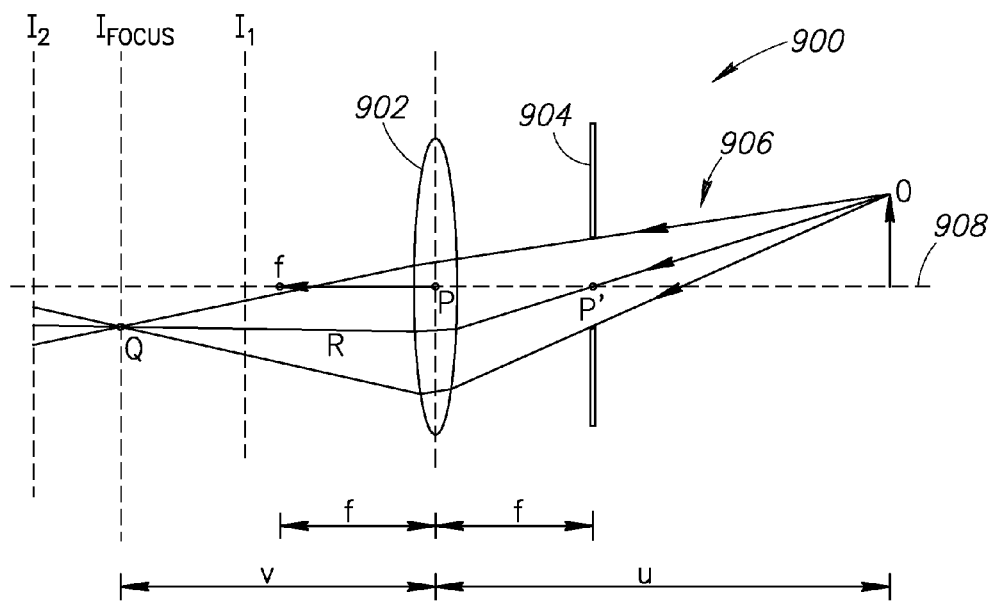
FIG. 9 is a schematic diagram illustrating of an image-side telecentric lens model usable in a machine-readable symbol reader, according to at least one illustrated embodiment.

Generally, an image-side (or image-space) telecentric lens or lens assembly is a lens assembly which has its exit pupil at approximately infinity, which means that the principal or chief rays (i.e., oblique rays which pass through the center of the aperture stop) are substantially parallel to the optical axis behind the lens assembly (i.e., image-side). An image-space telecentric lens produces images of the same size regardless of the distance between the lens and the image sensor array. This allows the lens to be focused to different distances without changing the size of the image. At the image sensor array 110, all of the principal rays from the telemetric lens assembly 126 hit substantially "straight on" or at approximately zero angle of incidence. This feature is utilized by the present embodiments to provide multiple parallel optical paths between the telecentric lens assembly 126 and the sensor array 110 to effectively partition the sensor array into multiple imaging regions. FIGS. 8 and 9, discussed below, depict simplified schematic diagrams of a conventional lens model 800 and a telecentric lens model 900, respectively.

As discussed in further detail below, the machine-readable symbol reader 100 also includes a focal element 130 disposed between the telecentric lens assembly 126 and the sensor array 110 such that at least some of the light rays arrive at the sensor array through the focal element. The focal element 130 operates to provide two or more image focus distances for light rays that strike two or more imaging regions of the sensor array 110. Further, image-side telecentricity minimizes the transition areas between the two or more imaging regions, which reduces blurring, among other things. For example, in some embodiments the focal element 130 is a thin plate of optical glass having a relatively high index of refraction $n_d$ (e.g., $n_d$ between 1.3 to 3.0) positioned over a first of two imaging regions of the sensor array. Utilizing a focal element 130 with a higher refractive index results in a thinner inserted glass plate having the same image-side optical path difference (OPD)=(n glass–n air)×d, where d is the thickness of glass. The focus difference on the object side is about =$M^2$×OPD, here M is the lateral magnification of the lens. For example, for a lens of M=20×, glass refractive index=1.7, and thickness d=0.5 mm, the focus difference on the object side is $20^2$×(1.7–1)×0.5 mm=140 mm.

The optical path for rays passing through the optical glass plate of the focus element 130 are bent to provide a different image focus compared to rays that strike the sensor array 110 at the second imaging region without passing through the plate. Thus, multiple focus positions are provided using only a single sensor array 110 and a single telecentric lens assembly 126. The level of focus shift of the rays away from the lens is dependent on the magnification of the lens assembly 126, the thickness of the focal element 130, and the index of refraction of the focus element.

The focal element 130 may be formed from any suitable material. In some embodiments, the focal element 130 is formed from inorganic materials such as high refractive index glasses. One example of a suitable material is Schott glass type LASF35, available from Schott North America, Inc., Elmsford, N.Y. under a trade name LASF35. LASF35 has an index of refraction of 2.022. In some embodiments, the focal element 130 is relatively thin to minimize the amount of light blocked by the focal element and to minimize negative effects on image focus. For example, in some embodiments the focal element 130 has a thickness of less than 1 millimeter, less than 0.5 millimeters, less than 0.3 millimeters, etc. The thickness of the focal element 130 may be selected to provide a desirable focus setting.

The sensor array 110 forms an electronic image of the fields of view 112 and 114. The sensor array 110 may comprise a wide range of image sensing devices for converting an optical image (or another wavelength in the electromagnetic spectrum) into an electrical signal. For example, the sensor array 110 may comprise a digital sensor, such as a charge-coupled device (CCD) sensor array or complimentary metal-oxide semiconductor (CMOS) sensor array, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the sensor array 110 has been exposed to light emanating from one or more of the fields of view 112 and 114, data from all the pixels can be sequentially read out in a selectable pattern (which may be row-by-row, sub-region by sub-region, or some other pattern). The pixel intensity data may optionally be converted to digital form using an analog-to-digital converter.

One suitable sensor array is the model EV76C560 CMOS sensor offered by e2v Technologies PLC, Essex, England, for example. Other suitable sensor arrays or camera devices may be employed, such as the model MT9V022 sensor sold by Micron Technology, Inc. of Boise, Id. In response to receiving an instruction from a controller 128, the sensor array 110 captures or acquires one or more images of the fields of view 112 and 114. In at least one implementation, the view volumes associated with fields of view 112 and 114 form a combined read volume of the data reader 100. Conceptually, the read volume includes a portion of space in front the window 116 in which machine-readable symbols may be read (e.g., detected and decoded) by the machine-readable symbol reader 100. In other words, the read volume may be referred to as a view volume within which there is a relatively high probability of a successful scan/read.

The machine-readable symbol reader 100 includes an optional illumination source 120, which is configured to illuminate the fields of view 112 and 114. The illumination source 120 may comprise any suitable source of light, such as one or more light emitting diodes (LEDs), flash strobes, incandescent or fluorescent lamps, or halogen bulbs. The illumination source 120 may generate light having one or more wavelengths. Alternatively, the machine-readable symbol reader 100 may rely on light from the ambient environment.

One or more illumination drivers or controllers 132 are optionally provided. The illumination driver 132 is configured to apply signals to the illumination source 120 to, for example, strobe the illumination source at desired times or to light the illumination source constantly for a period of time. The illumination source 120 may be omitted in certain embodiments. The illumination source 120 may be mounted within a housing of the machine-readable symbol reader 100 (e.g., behind window 116) or may be mounted external to the housing, such as on an exterior surface of the housing or remotely located from the machine-readable symbol reader 100. For example, the illumination source 120 may be mounted to a separate stand or another part of a checkout stand and positioned some distance from the machine-readable symbol reader 100.

The sensor array 110 and the illumination driver 132 connect to the controller 128, which may be, for example, one or more of a processor, microprocessor, controller, microcontroller, digital signal processor (DSP), graphical processing unit (GPU) or the like (generally "processor"). The connection may be via a bus 134 or other communication mechanism, such as direct connections of a serial, parallel, or other type. The controller 128 generally controls and coordinates the operation of other devices to which it is connected, such as one or more of the sensor array 110, the illumination driver 132, and an audio/visual (A/V) driver 136. The A/V driver 136 is optionally included to drive a one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator device 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal.

The machine-readable symbol reader 100 also includes memory 140, which may be implemented using one or more standard memory devices. The memory devices may include, for instance, RAM 142, ROM 144, and EEPROM devices, and may also include magnetic or optical storage devices, such as hard disk drives, flash memory, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or IEEE 1194 connection.

According to one embodiment, any number of program modules are stored in the drives (e.g., data storage 148) and the memory 140, including an operating system (OS) 150, one or more application programs or modules 152, such as instructions to implement the methods described herein, and data 154. Any suitable operating system 150 may be employed. One of the program modules 152 may comprise a set of instructions to implement the methods for generating image data using a data reader having multiple fields of view described herein. For example, one of the program modules 152 may comprise a set of instructions to implement the method 700 illustrated in FIG. 7. The data 154 may include one or more configuration settings or parameters, or may include image data from the sensor array 110 and decoded machine-readable symbol data.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be configured to display a navigable menu system or graphical user interface (GUI) that allows the user to select the illumination and image capture settings.

The I/O controller 156 may be configured to receive user input from one or more input devices, such as a keyboard, a pointing device, or other wired/wireless input devices, that allow the user to, for example, configure the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

The network interface 160 may optionally be provided to communicate with one or more hosts or other devices (e.g., a computer, a point-of-sale terminal, a point-of-sale computer system, or a cash register). For example, data gathered by or decoded by the machine-readable symbol reader 100 may be passed along to a host computer. According to one embodiment, the network interface 160 comprises a universal interface driver application specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low or high powered electromagnetic waves to transmit data using any wireless protocol, such as Bluetooth™, IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other embodiments may have less than all of these components, may contain other components, or both. For example, the machine-readable symbol reader 100 may comprise a fixed scanner, such as an on-counter scanner or in-counter scanner, or a portable scanner, such as a handheld scanner. In addition, the machine-readable symbol reader 100 may include a radiofrequency identification (RFID) reader or interrogator and/or or a magnetic stripe reader. Such may be particularly useful when employed as a point-of-sale (POS) terminal.

After the sensor array 110 has been exposed to light reflected by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110. The controller 128 may condition the data received from the sensor array 110 and may generate an output that generally identifies which regions of the image correspond to highly reflective or light areas, and which correspond to less reflective or dark areas, for example.

The illumination source 120, the lens assembly 126, the sensor array 100, the controller 128, and the memory 140 and 148 included with the machine-readable symbol reader 100 form the imaging chain components of the machine-readable symbol reader 100. In some instances, the imaging chain components account for the majority of the cost of the machine-readable symbol reader 100. Thus, it may be desirable to minimize the number of imaging chain components to help reduce the cost of the machine-readable symbol reader 100. By using the image-side telecentric lens assembly 126, the focal element 130 and the sensor array 110 to capture and process images of multiple fields of view, the machine-readable symbol reader 100 can effectively do the work of multiple machine-readable symbol readers without requiring added moving parts or added drive circuits.

Figure 2:
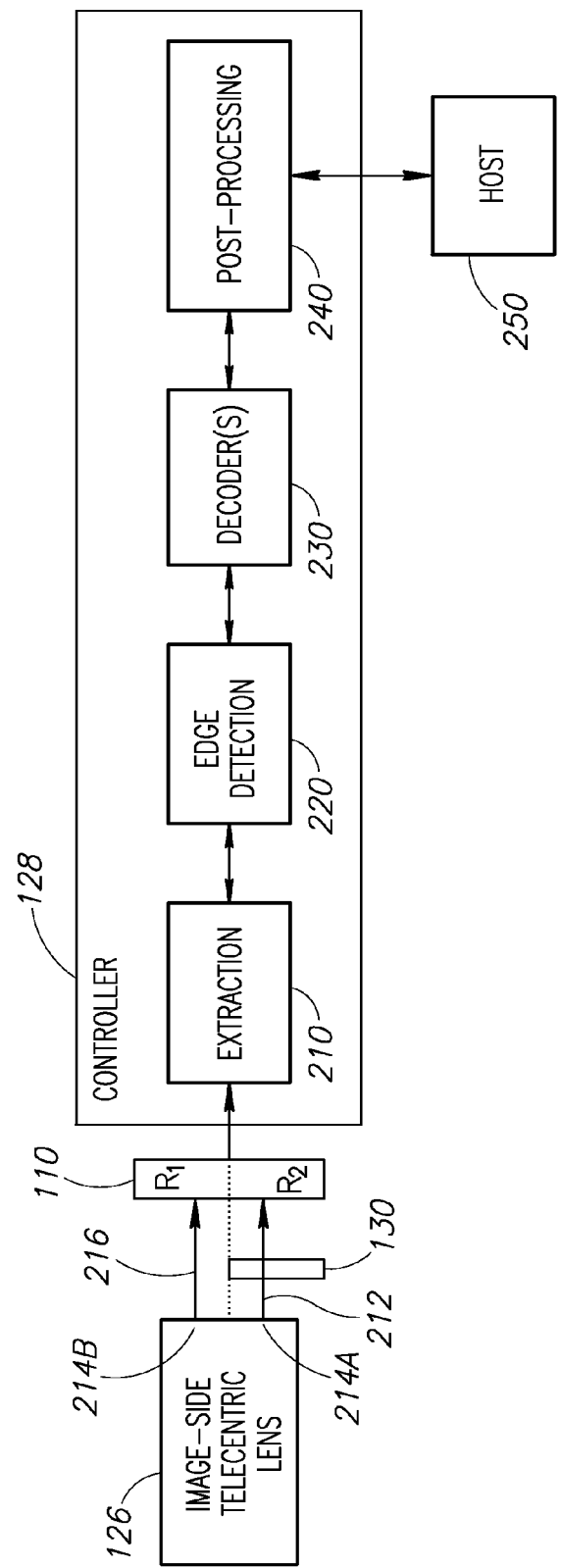
FIG. 2 is a block diagram illustrating various components used to capture and process images captured by a sensor array of the machine-readable symbol reader of FIG. 1, according to at least one illustrated embodiment.

FIG. 2 is a block diagram illustrating various components that may be used to process images captured by the sensor array 110 in FIG. 1, according to one embodiment. In some embodiments, only a select portion (e.g., every nth row) or region of the image data captured by the sensor array 110 corresponding to one or more imaging regions is stored and processed. Optionally, the select portions or imaging regions may be stored in nontransitory computer- or processor-readable media, for instance a memory, such as memories 140 or 148. According to another embodiment, all of the image data captured by the sensor array 110 may be used to search for and decode a machine-readable symbol (e.g., using any suitable two-dimensional decoding algorithm). The controller 128 may optionally include or execute an imaging region extraction module 210 to read or assemble samples or pixels from the sensor array 110 lying along one or more lines or other defined paths across the image at predetermined angles with respect to one another or in another desired scan pattern. For example, the extraction module 210 may be utilized to partition the sensor array 110 into one or more imaging regions $R_1$ and $R_2$ (see FIGS. 3A and 3B) each of which correspond to an image focus distance determined by the focal element 130. In the example shown in FIG. 2 and FIGS. 3A and 3B, the focal element 130 is positioned in front of the imaging region $R_2$ of the sensor array 110 in an optical path of the imaging region $R_2$ such that light rays 212 exiting from one side 214A of the image-side telecentric lens assembly 126 pass through the focus element 130 before striking imaging region $R_2$. Light rays 216 exiting from a second side 214B of the image-side telecentric lens assembly 126 strike the imaging region $R_1$ without passing through the focus element 130. Since the focal element 130 bends the rays 212 passing therethrough, the sensor array 110 receives rays 212 and 216 at two different focus settings.

The imaging regions extraction module 210 may define and map imaging regions onto a raster pattern, thereby allowing the pixels of the raster which fall on the imaging regions $R_1$ and $R_2$ to be identified and processed for decodable data, and possibly stored for later processing. In some embodiments, the extraction module 210 may store only a select portion of the image data corresponding to imaging regions $R_1$ and $R_2$ to reduce the total amount of data that needs to be stored and processed. The extraction module 210 may be omitted in certain embodiments, such as when a two-dimensional decoding algorithm is used. Region R1 or region R2 may be set to selectable read out for minimized decoding time. For example, the imaging regions extraction module 210 may read either region R1 or region R2 based on whether an object is in a near field or a far field. As another example, the imaging regions extraction module 210 may read either region R1 or region R2 based on whether the scanner is picked up by a user or whether a button on the scanner is pressed. As another example, the imaging regions extraction module 210 may read region R1 or region R2, or region R1 and region R2, with a fixed interleaving pattern. As another example, the imaging regions extraction module 210 may always read region R1 and region R2.

An edge detection module 220 identifies edge transition locations in the extracted data using any suitable edge detection technique. For example, after an image has been captured by the sensor array 110, the image may be represented by a certain number of pixels, each of which is represented by a certain value. For a grayscale image where each pixel is represented by 8 bits, a pixel may have a value ranging from 0 (black) to 255 (white) with various shades of gray between 0 and 255. While the image may be a grayscale image, it may also be a color image or a black-and-white image. Additionally, while each pixel may be represented by 8 bits, each pixel may be represented by any number of bits (e.g., 10 bits or 12 bits). Because edges in images generally have strong intensity contrasts, an increase (or decrease) in intensity from one pixel to the next is indicative of an edge. Accordingly, many edge detection techniques involve calculating a derivative of the intensity changes in pixel values (e.g., intensity changes between a first pixel and an adjacent pixel or more than one adjacent pixels). With regard to a first derivative, an edge transition can occur at a local maxima or minima. With regard to second derivatives, edges occur at zero crossings. Thus, edges may be located by convolving image data with a kernel that approximates a first or second derivative.

Based on the edge locations, one or more decoders 230 (e.g., low-level decoders, high-level decoders, or any combination thereof) may convert the sequence of edges and spacing between the edges into data usable by a host 250. For example, a low-level decoder may convert the sequence of edges and spacing between the edges into a set of machine-readable symbol characters, such as start patterns, stop patterns, and code words. The specific nature of the decoder(s) 230 varies depending on the particular symbology used to encode the data. For example, in the PDF417 symbology, data is encoded by converting data into codewords (i.e., high level encoding) and representing the codewords with a certain sequence of bars and spaces (i.e., low level encoding). Thus, in the PDF417 symbology, data may be decoded by converting the sequence of bars and spaces into codewords and converting the codewords into data. The controller 128 may include or execute a set of decoders 230 for each symbology the data reader 100 is configured to read. The decoder 230 may also combine partial sections of a machine-readable symbol to form data representing the complete machine-readable symbol using a process known as stitching.

One or more of the extraction module 210, the edge detection module 220, or the decoder 230 may be replaced by a vision library module that is configured to find a decodable feature of a machine-readable symbol, such as start characters, stop characters, center characters, guard characters, and check characters. After the decodable feature is located, the vision library module attempts to decode the machine-readable symbol by processing data in one or more directions extending away from the decodable feature.

The controller 128 may include or execute a post-processing module 240 to further process the output from the decoder(s) 230 before sending the data to the host 250. For example, the post-processing module 240 may include an amplification module to amplify one or more spatial frequencies, a filtering module, and/or a timer module. The timer module may be used to indicate when to stop attempting to find characters. For example, to maximize throughput, the timer module may begin measuring a time interval at some event such as the start of decoding data from an image frame, or the detection of a potential machine-readable symbol within an image frame, and the edge detection module 220, the decoder(s) 230, or both, may stop looking for characters after a certain period of time or after a certain number of data frames have been captured. In other words, the timer module prevents the edge detection and decoder modules from spending too much time trying to decode data that is not readable or decodable (or at least not easily readable or decodable) or that has already been decoded.

According to one embodiment, the machine-readable symbol reader 100 transmits the decoded machine-readable symbol data to the host 250 or another device (e.g., a computer, a point-of-sale terminal, a point-of-sale computer system, or a cash register). The transmission may be performed in a point-to-point manner or may be broadcast over a wired or wireless network. The host 250 (or another device) may present data, prompts, and otherwise communicate with the user via one or more display devices. For example, the host 250 (or another device) may present the decoded data to the user via a display, such as the object type (e.g., product type) corresponding to the scanned machine-readable symbol and data associated with the object type (e.g., a price of the product). The data associated with the object type may be encoded in the machine-readable symbol or accessed from a local or remote database based upon the object type. By way of another example, the host 250 (or another device) may cause the decoded data to be recorded on a processor-readable medium. As another example, the host (or another device) may instruct a printer to print the object type and data corresponding to the object type (e.g., print the product type and associated price on a receipt). The machine-readable symbol reader 100 may also store the decoded machine-readable symbol data in memory 140, memory 148, or both memories 140 and 148. For example, if the machine-readable symbol reader 100 is operating in a portable mode or the host 250 is unavailable, the decoded data may be buffered by the machine-readable symbol reader 100 for later transmission in a batch mode. Additionally, the machine-readable symbol reader 100 may acknowledge that machine-readable symbol data has been successfully decoded, such as by sounding a beep customarily associated with machine-readable symbol readers.

Figure 3A:
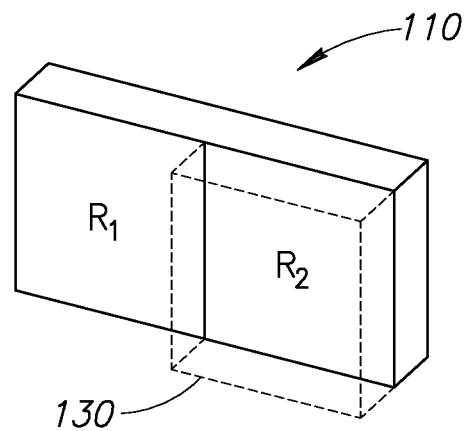
FIG. 3A is a perspective view of a sensor array broken up into two imaging regions, and a focal element in an optical path of one of the two imaging regions, according to at least one illustrated embodiment.
Figure 3B:
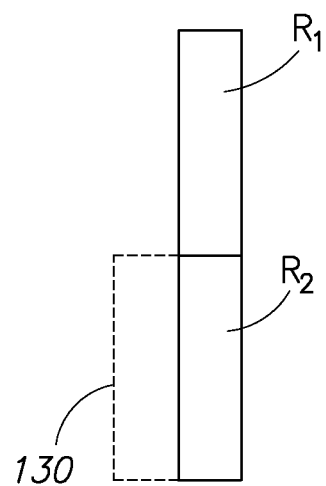
FIG. 3B is a top view of the sensor array and focal element shown in FIG. 3A.

FIG. 3A is a schematic perspective view of the sensor array 110 that has been partitioned into the first imaging region $R_1$ and a second imaging region $R_2$. FIG. 3A also shows the focal element 130 in dashed lines disposed in front of the imaging region $R_2$. FIG. 3B illustrates a top view of the sensor array 110 and the focal element 130. In FIGS. 3A and 3B, the focal element 130 is formed as an optical glass plate (e.g., LASF35) disposed adjacent the imaging region $R_2$. In some embodiments, the optical glass plate may be affixed to the sensor array 110 (e.g., using a suitable adhesive). In some embodiments, the optical glass plate may be spaced apart from the sensor array 110. As discussed above, the sensor array 110 may be divided into more than two imaging regions by providing one or more focal elements 130 that provide different focus shifts at different regions of the sensor array. For example, an optical glass plate may be provided that has a first thickness over a first imaging region of a sensor array, a second thickness over a second imaging region of the sensor array, and a third thickness over a third imaging region of the sensor array.

Figure 4:
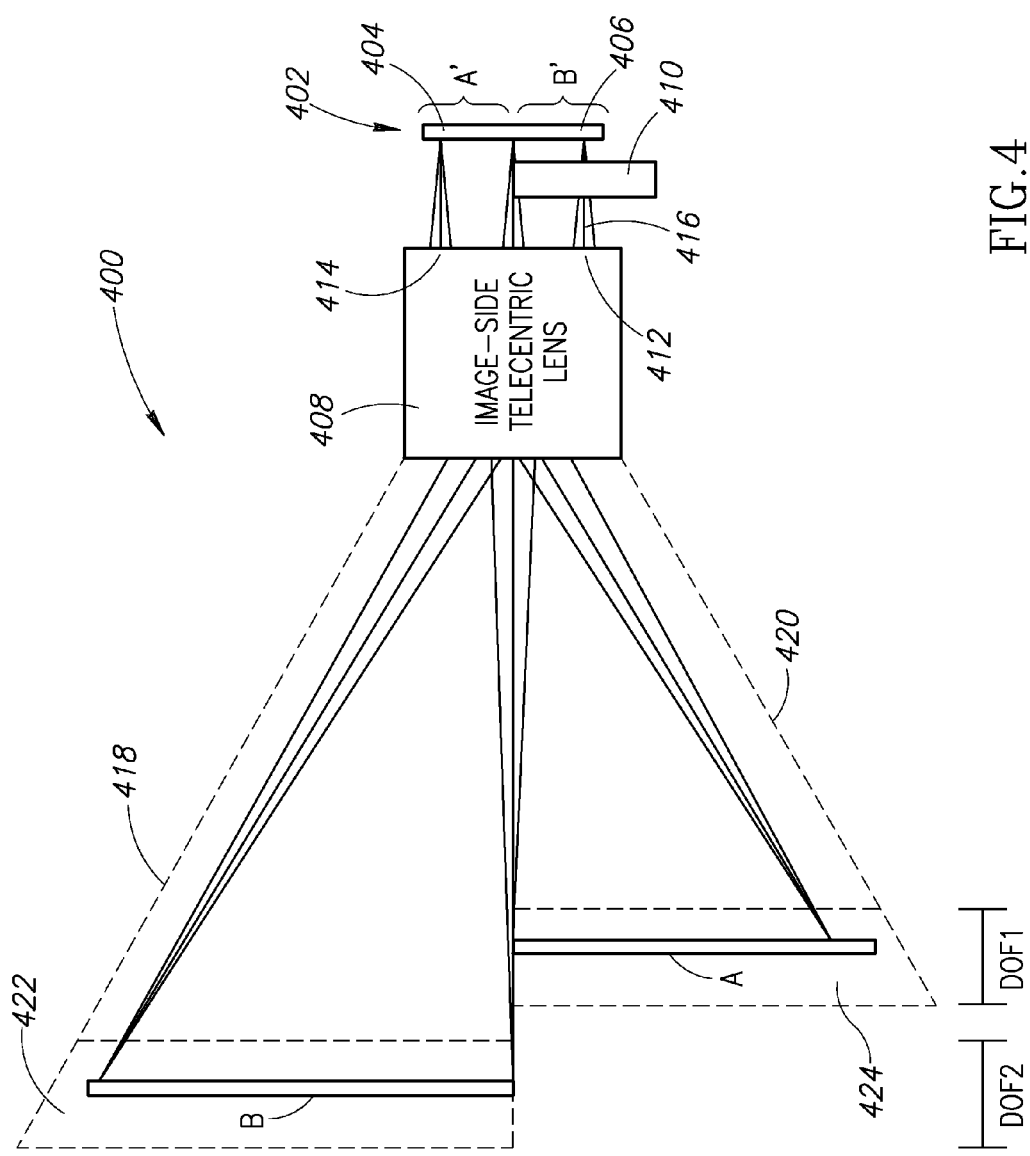
FIG. 4 is a schematic diagram of a machine-readable symbol reader having multiple fields of view, according to at least one illustrated embodiment.

FIG. 4 is a schematic diagram illustrating select components of a machine-readable symbol reader 400 that includes a sensor array 402 that has been effectively partitioned into two imaging regions 404 and 406 utilizing an image-side telecentric lens 408 and an optical glass plate 410 having a relatively high index of refraction (e.g., n approximately between 1.3 and 3.0) and a thickness (e.g., 0.5 mm, 1.0 mm, etc.). The machine-readable symbol reader 400 is configured to image objects A and B disposed at two different locations and distances. The optical glass plate 410 is positioned such that rays 416 exiting the telecentric lens assembly 408 on a first side 412 thereof pass through the optical glass plate 410 prior to striking the imaging region 406 of the sensor array 402 while rays exiting the telecentric lens assembly on a second side 414 thereof strike the imaging region 404 of the sensor array without passing through the optical glass plate. The optical glass plate 410 causes the imaging region 406 of the sensor array 402 to have a separate and distinct field of vision 418 from the field of vision 420 of the imaging region 404. Because of its relatively high index of refraction, the optical glass plate 410 causes the imaging region 406 to have a focus position and depth of field 422 (DOF2) that is at greater distance than the focus position and depth of field 424 (DOF1) of the imaging region 404. Thus, the machine-readable symbol reader 400 is able to simultaneously detect objects A and B located at two different distances and two different directions.

Figure 5:
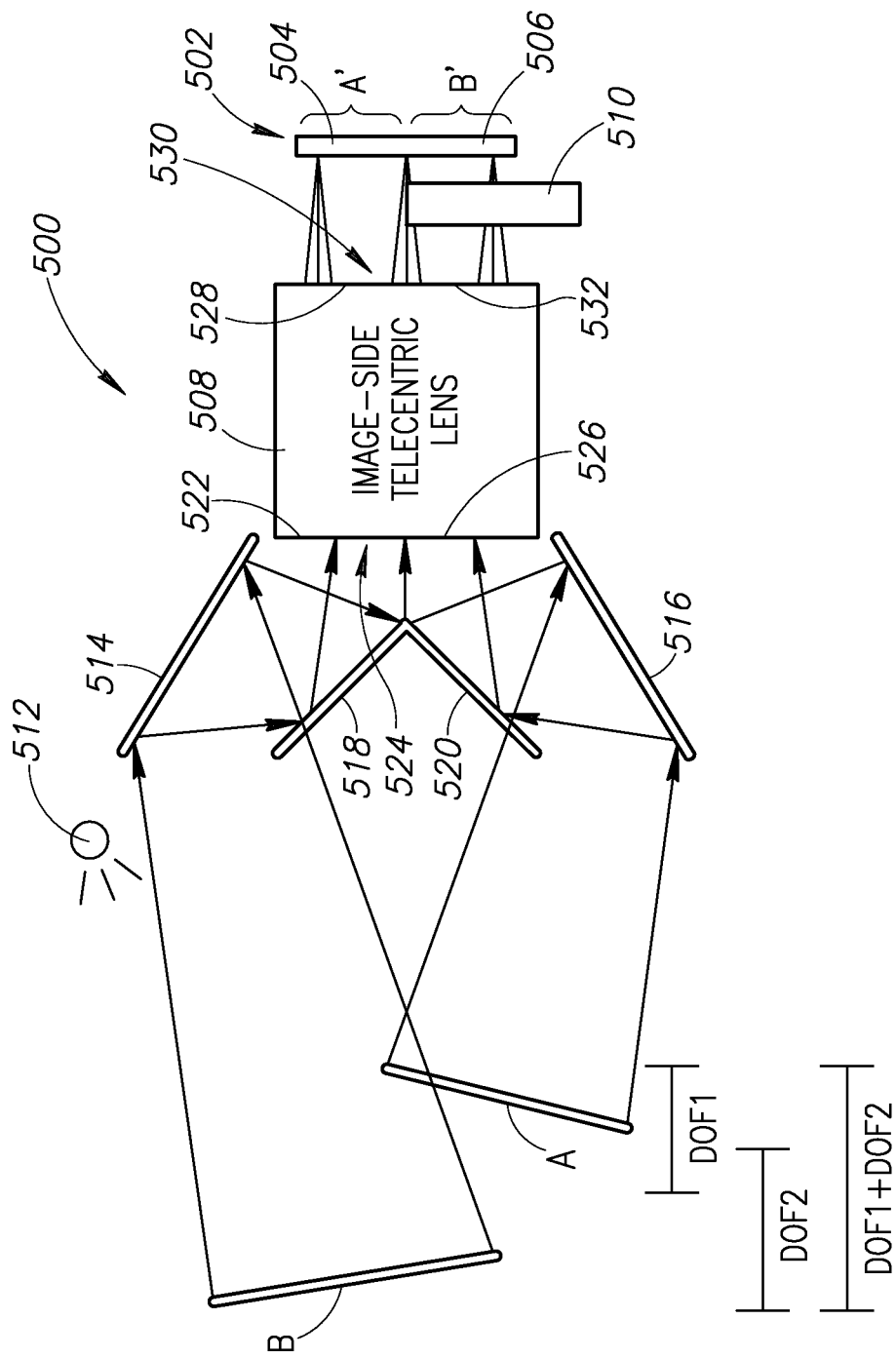
FIG. 5 is a schematic diagram of a machine-readable symbol reader having multiple fields of view, according to at least one illustrated embodiment.

FIG. 5 is a schematic diagram illustrating a machine-readable symbol reader 500 similar to the machine-readable symbol reader 400 of FIG. 4. The machine-readable symbol reader 500 includes a sensor array 502 that has been effectively partitioned into two imaging regions 504 and 506 utilizing an image-side telecentric lens 508 and an optical glass plate 510. Light from an illumination source 512 reflects from objects A and B, reflects from mirrors 514 and 516, reflects from mirrors 518 and 520, and enters the image-side telecentric lens 508. The mirrors 514 and 518 function to reflect light from a first field of view including the object B onto a first side 522 of an entrance portion 524 of the telecentric lens 508 while the mirrors 516 and 520 function to reflect light from a second field of view including the object A onto a second side 526 of the entrance portion of the telecentric lens. In this embodiment, light entering the second side 526 of the entrance portion 524 of the telecentric lens 508 exits at a first side 528 of an exit portion 530 of the telecentric lens, and light entering the first side 522 of the entrance portion exits at a second side 532 of the exit portion. The optical glass plate 510 is positioned such that rays exiting the telecentric lens assembly 508 on the second side 532 thereof pass through the optical glass plate 510 prior to striking the imaging region 506 of the sensor array 502 while rays exiting the telecentric lens assembly on the first side 528 thereof strike the imaging region 504 of the sensor array without passing through the optical glass plate. The optical glass plate 510 causes the imaging region 506 of the sensor array 502 to have a separate and distinct field of vision from the field of vision of the imaging region 504.

In the example shown in FIG. 5, the mirrors 514, 516, 518 and 520 cause overlapping fields of vision to provide an overlapping read volume. Additionally, the optical plate 510 is configured to provide overlapping depths of field DOF1 and DOF2 for images detected at imaging regions 504 and 506, respectively. Thus, the machine-readable symbol reader 400 may provide a longer depth of field (e.g., DOF1+DOF2) to detect objects at a relatively large range of distances using a single lens assembly and a single sensor array.

In the example of FIG. 5, each of the imaging regions 504 and 506 are located at an image plane determined by a separate set of mirrors and the telecentric lens 508. In some embodiments, more than two imaging regions may be utilized. This feature allows each of the respective imaging regions to act as a "periscope" assembly, which permits each of the individual imaging regions to "view" or be directed at a particular direction and focus setting distinct from any other imaging regions. Further, each of the individual imaging regions may be able to view an object from different angles from other imaging regions, which may be beneficial in the case where a machine-readable symbol is not facing perpendicular to a window of a data reader.

Figure 6:
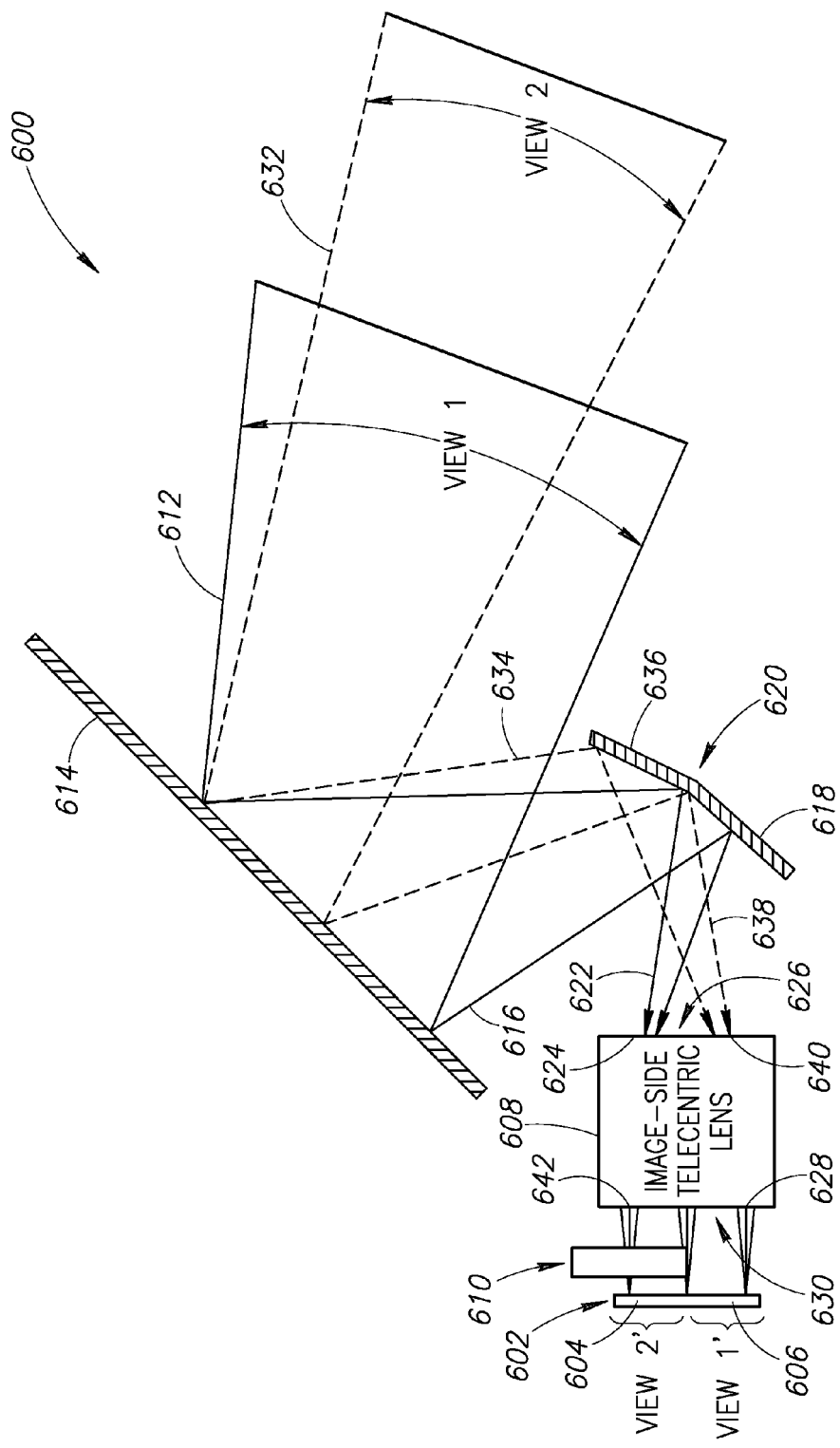
FIG. 6 is a schematic diagram of a machine-readable symbol reader having multiple fields of view, according to at least one illustrated embodiment.

FIG. 6 is a schematic diagram illustrating a machine-readable symbol reader 600 of similar configuration to the machine-readable symbol readers 400 and 500 of FIGS. 4 and 5, respectively. The machine-readable symbol reader 600 includes a sensor array 602 that has been effectively partitioned into two imaging regions 604 and 606 utilizing an image-side telecentric lens 608 and an optical glass plate 610 having a relatively high index of refraction.

A first image of a wide field of view (View 1) passes along a path segment 612 where it is deflected off of a primary mirror 614 along a path segment 616 to a first portion 618 of a secondary mirror 620, which reflects the image sideward and rearward along a segment 622 to a first side 624 of an entrance portion 626 of the telecentric lens 608. The first image exits a second side 628 of an exit portion 630 of the telecentric lens 608 and strikes the imaging region 604 of the sensor array 602.

A second image of a narrow field of view (View 2) passes along a path segment 632 where it is deflected off of the primary mirror 614 along a path segment 634 to a second portion 636 of a secondary mirror 620, which reflects the image sideward and rearward along a segment 638 to a second side 640 of the entrance portion 626 of the telecentric lens 608. The second image exits a first side 642 of the exit portion 630 of the telecentric lens 608, passes through the optical plate 610, and strikes the imaging region 606 of the sensor array 602.

In the example of FIG. 6, the secondary mirror is utilized to separate View 1 and View 2. The optical plate 610 inserted in the path of View 2 between the telecentric lens 608 and the sensor array 602 causes a longer focus for View 2 relative to View 1. As an example, View 1 may be utilized for imaging at a relatively shorter distance while View 2 may be utilized for imaging at a relatively larger distance. In practice, a machine-readable symbol reader may capture images at both views simultaneously, or may capture images at each view separately. In some embodiments, the machine-readable symbol reader may first attempt to detect a machine-readable symbol using a first view (e.g., View 1), then subsequently attempt to detect a machine-readable symbol using a second view (e.g., View 2) for example, to confirm the detection using the first view or if the detection using the first view failed.

Figure 7:
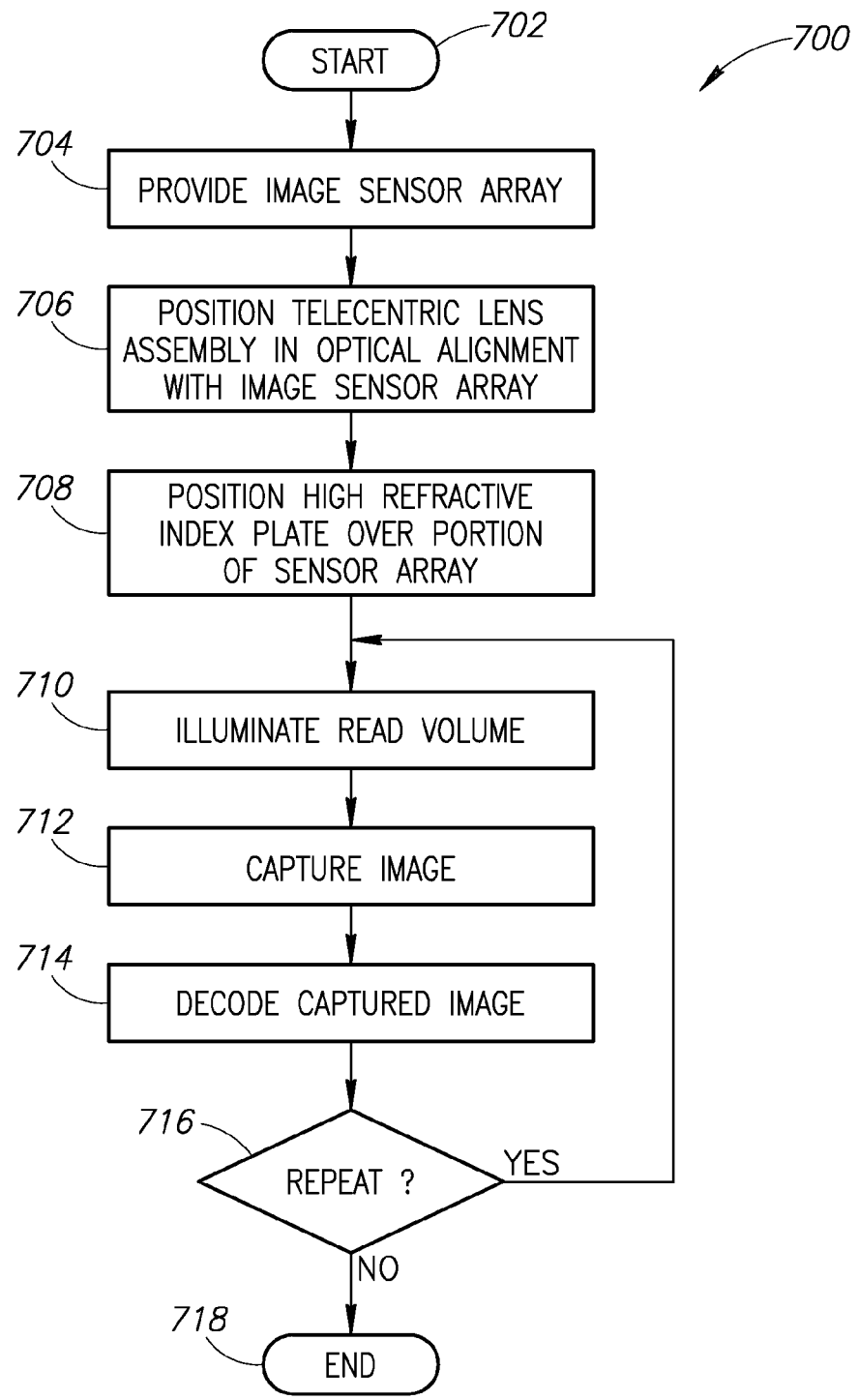
FIG. 7 is a flow chart of a method for generating image data using a machine-readable symbol reader having multiple fields of view, according to at least one illustrated embodiment.

Referring to FIG. 7, a method 700 for generating image data using the machine-readable symbol readers discussed herein is illustrated according to one embodiment. The method begins at 702.

At 704, an image sensor array is provided. As discussed above, the sensor array may comprise a wide range of image sensing devices for converting an optical image (or another wavelength in the electromagnetic spectrum) into an electrical signal. For example, the sensor array may comprise a digital sensor, such as a CCD sensor array or a CMOS sensor array.

At 706, an image-side telecentric lens assembly is positioned in optical alignment with the image sensor array. The image-side telecentric lens assembly may include one or more lenses or other optical components to provide suitable functionality.

At 708, a focal element or plate having a relatively high index of refraction is positioned over a portion of the sensor array between the sensor array and the image-side telecentric lens. For example, a glass sheet may be glued on top of a cover glass of an image sensor array. The focal element may have an index of refraction and a thickness selected to provide a desirable focusing shift for rays passing therethrough. As discussed above, the focal element may be affixed to the sensor array using a suitable adhesive (e.g., glue). In some embodiments, the focal element may cover all or a portion of the sensor array. For example, in one embodiment, the focal element may include a first region having a first thickness covering a first imaging region of the sensor array, and a second region having a second thickness covering a second imaging region of the sensor array such that the first and second imaging regions of the sensor array have different focus settings.

At 710, a field of view of the machine-readable symbol reader is illuminated. For example, the illumination driver 132 of FIG. 1 may drive the illumination source 120 with an illumination-driving waveform to cause the illumination source to emit an optical pulse or a series of optical pulses. In some embodiments, different illumination may be provided dependent on which field of view is being imaged. For example, in the embodiment of FIG. 5 wherein the two fields of view 418 and 420 are positioned in different directions, the data reader may illuminate only one field of view at a time, or may illuminate both fields of view simultaneously.

At 712, an image is captured. For example, the controller 128 of FIG. 1 may cause the sensor array 110 to capture a single image or capture multiple images at an image capture rate (e.g., 60 fps). By way of another example, the sensor array 110 may already be capturing images at the image capture rate and the image captured at 712 is the next image captured at the image capture rate or the previous image captured at the image capture rate. Because the illumination source 120 may illuminate one or both of the fields of view (e.g., fields of view 112 and 114) at the same time or approximately the same time as the sensor array 110 captures an image, the captured image should include objects (e.g., machine-readable symbols) within the fields of view.

At 714, the image captured at 712 is processed to determine whether the captured image contains decodable data corresponding to one or more machine-readable symbols. Any suitable technique may be used to identify decodable data. For example, pixel data corresponding to one or more imaging regions of the captured image may be processed to locate edge transitions and to attempt to decode the captured image based on the edge transition locations (e.g., using a low level decoder, a high level decoder, or both). By way of another example, a two-dimensional decoding algorithm may be used to determine whether the captured image contains decodable data corresponding to a machine-readable symbol. Any suitable two-dimensional decoding algorithm may be used. The two-dimensional decoding algorithm may be configured to process the captured image to identify (and optionally decode) machine-readable symbols within the captured image. According to one embodiment, the captured image is not decoded at 714. For example, the captured image may be processed to determine whether the captured image contains or is likely to contain decodable data, such as when the relative locations of edge transitions and spaces there between yield at least one valid character, codeword, or overhead character, or when a minimum number of edge transitions are detected. If the captured image contains or is likely to contain decodable data, the captured image may be stored in a memory (e.g., memory 140 or 148 of FIG. 1) for later processing and decoding. According to another embodiment, the captured image is decoded at 714 using a suitable decoder (e.g., decoder(s) 230 in FIG. 2).

At 716, a determination is made as to whether to repeat acts 710-714. For example, if one or more machine-readable symbols is detected and/or decoded at 714, the method 700 may terminate. By way of another example, the method 700 may terminate if no machine-readable symbols are detected and/or decoded at 714 within a predetermined period of time. By way of still another example, acts 710-714 may automatically be repeated until a machine-readable symbol is detected and/or decoded at 714. Act 716 may be omitted in certain embodiments. For example, the method 700 may automatically end after 714 or the method may automatically repeat acts 710-714 one or more times. In certain embodiments, the number of times acts 710-714 are repeated is programmable by the user.

The acts 710-714 may be continually repeated either while the machine-readable symbol reader is powered ON, or while a belt that carries object or articles past the machine-readable symbol reader is moving. Alternatively or additionally, the acts 710-714 may be initiated or performed in response to a trigger event. The trigger event may comprise any number of events, such as the actuation of a trigger button or switch (e.g., the user manually depresses a trigger button or switch, which may be disposed on a housing of the data reader), receiving a command from a host computer (e.g., the host 250 in FIG. 2) or device. The trigger event may be object dependent, time dependent, or both object and time dependent. For example, an object trigger event may comprise the presence of an object within the read volume or the detection of an object in the read volume. By way of another example, an object trigger event may be caused by the presence of an object within the read volume for a predetermined duration, such as a predetermined number of image frames or a predetermined period of time.

In some embodiments, the method 700 may omit act 710 (e.g., the machine-readable symbol reader may rely on ambient light instead of illuminating the fields of view). The method 400 may include additional acts according to other embodiments. The method ends at 718.

FIG. 8 is a schematic diagram illustrating a conventional lens model 800 that may be used in digital imaging and computer vision. In this model 800, a thin lens 802 is provided and an aperture 804 is positioned to coincide with the lens. Light rays 806 that radiate from a scene point O and pass through the aperture 804 are refracted by the lens 802 to converge at a point Q on a focused image plane $I_{FOCUS}$. The relationship between an object distance u, the focal length f of the lens 802, and the image distance v is given by: $1/f=1/u+1/v$. Each point on the object plane is projected onto a single point on the focused image plane $I_{FOCUS}$, causing a focused image to be formed. When the image plane is changed (e.g., by moving the sensor array) to an image plane $I_1$ or $I_2$, the energy received from a scene point O is distributed over a circular area on the image plane, rather than the focused point Q.

FIG. 9 is a schematic diagram illustrating an image-side telecentric lens model 900 that includes a lens 902 and an aperture 904. Compared to the conventional lens model 800 of FIG. 8, the notable modification in this simplified example is that the aperture 904 is disposed at the front-focal plane, which is a focal length (f) in front of a principal point P of the lens 902. Light rays 906 that radiate from a scene point O and pass through the aperture 904 are refracted by the lens 902 to converge at a point Q on a focused image plane $I_{FOCUS}$. A ray R of a scene point O that passes through a center P' of the aperture 904 (i.e., the principal ray), emerges from the lens 902 parallel to the optical axis 908 on the image side of the lens 902. The parallel ray R is the axis of a cone that includes all light rays radiated by the scene point O passed through the aperture 904 and the lens 902. As a result, the effective image coordinates of the scene point O on the focused image plane $I_{FOCUS}$ stay constant irrespective of the displacement of the sensor plane from the focused image plane. The image from an image-side telecentric lens is insensitive to small changes in the position of the image plane. Thus, these small changes do not affect the accuracy of measurements made on the resulting images. If the image plane is now defocused, then the image will blur but its position and magnification will remain constant.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A machine-readable symbol reader, comprising:
a two-dimensional sensor array having a first imaging region to acquire a first two dimensional image of a first read volume and a second imaging region to acquire a second two dimensional image of a second read volume, the second read volume different than the first read volume, and the first imaging region of the two-dimensional sensor array does not overlap with the second imaging region of the two-dimensional sensor array;
an optical system optically aligned with the sensor array along an optical axis to direct light rays reflected from an object toward the sensor array, the optical system is telecentric on a side thereof proximate the sensor array and which provides principal rays at the sensor array from the optical system normal to the sensor array; and
a focal element disposed between the optical system and the sensor array, the focal element directs a first portion of the rays that arrive at the sensor array through the focal element and onto the first imaging region of the sensor array, and allows a second portion of the rays which arrive at the sensor array concurrently with the first portion of the rays to arrive at the sensor array without passing through the focal element, the focal element produces a first image focus distance for the first portion of the rays detected by the first imaging region of the sensor array, the first image focus distance different from a second image focus distance for the second portion of the rays detected by the second imaging region of the sensor array.

2. The machine-readable symbol reader of claim 1 wherein the focal element comprises a plate of optical glass disposed between the optical system and the sensor array.

3. The machine-readable symbol reader of claim 2 wherein the plate of optical glass has a refractive index of between 1.3 and 3.0.

4. The machine-readable symbol reader of claim 2 wherein the plate of optical glass has a thickness of less than one millimeter.

5. The machine-readable symbol reader of claim 2 wherein the plate of optical glass has a thickness of less than or equal to 0.5 millimeters.

6. The machine-readable symbol reader of claim 1 wherein the focal element is affixed to the sensor array and covers at least the first imaging region of the sensor array.

7. The machine-readable symbol reader of claim 1 wherein the first imaging region of the sensor array has a first two-dimensional area and the second imaging region of the sensor array has a second two-dimensional area, the second two-dimensional area being equal in size to the first two-dimensional area.

8. The machine-readable symbol reader of claim 1 wherein the first imaging region of the sensor array has a first two-dimensional area and the second imaging region of the sensor array has a second two-dimensional area, the second two-dimensional area different in size from the first two-dimensional area.

9. The machine-readable symbol reader of claim 1, further comprising:
one or more fixed light reflective surfaces optically associated with the optical system, the one or more fixed light reflective surfaces direct light from the first read volume along a first path to the optical system and the first imaging region of the sensor array, and direct light from the second read volume along a second path to the optical system and the second imaging region of the sensor array.

10. The machine-readable symbol reader of claim 9 wherein at least a portion of the first read volume and at least a portion of the second read volume overlap each other to form an overlapping read volume.

11. The machine-readable symbol reader of claim 9 wherein the first read volume and the second read volume do not overlap each other.

12. The machine-readable symbol reader of claim 1 wherein the first image focus distance for the first read volume has an associated first depth of field and the second image focus distance for the second read volume has an associated second depth of field, the first depth of field overlaps with the second depth of field to provide an overlapping depth of field for the machine-readable symbol reader greater than the first depth of field and the second depth of field.

13. The machine-readable symbol reader of claim 1 wherein the sensor array defines a third imaging region for acquiring a third two dimensional image of a third read volume, and the focal element produces a third image focus distance for rays detected by the third imaging region of the sensor array, the third image focus distance different from the first image focus distance and the second image focus distance.

14. The machine-readable symbol reader of claim 13 wherein the focal element has a first thickness at a first portion thereof that passes rays to the first imaging region and a second thickness at a second portion thereof that passes rays to the second imaging region.

15. The image data reader of claim 13 wherein the focal element is a fixed element and comprises a first optical glass having a first thickness and a second optical glass having a second thickness.

16. The machine-readable symbol reader of claim 1 wherein the sensor array comprises one of a charge-coupled device (CCD) sensor array or complementary metal-oxide-semiconductor (CMOS) sensor array.

17. A method of reading data from a machine-readable symbol by imaging, the method comprising:
positioning a two-dimensional sensor array in optical alignment with an optical system such that rays passing through the optical system arrive at the sensor array, the optical system telecentric on a side proximate the sensor array whereby principal rays arrive at the sensor array from the optical system substantially normal to the sensor array; and
positioning a focal element between the sensor array and the optical system such that a first portion of the rays arrive at the sensor array from the optical system through the focal element and a second portion of the rays that arrive concurrently with the first portion of the rays arrive at the sensor array without passing through the focal element, the focal element produces a first image focus distance for the first portion of the rays detected by a first imaging region of the sensor array, the first image focus distance different from a second image focus distance for the second portion of the rays detected by a second imaging region of the sensor array, and the first imaging region of the sensor array does not overlap with the second imaging region of the sensor array.

18. The method of claim 17, further comprising:
capturing light reflected from the machine-readable symbol by the sensor array.

19. The method of claim 17 wherein positioning a focal element comprises positioning a plate of optical glass between the optical system and the sensor array.

20. The method of claim 17 wherein positioning a focal element comprises positioning a plate of optical glass over the first imaging region.

21. The method of claim 17 wherein positioning a focal element comprises positioning a plate of optical glass between the optical system and the sensor array, and the plate of optical glass has a refractive index of between 1.3 and 3.0.

22. The method of claim 17 wherein positioning a focal element comprises positioning a plate of optical glass between the optical system and the sensor array, and the plate of optical glass has a thickness of less than one millimeter.

23. The method of claim 17 wherein positioning a focal element comprises positioning a plate of optical glass between the optical system and the sensor array, and the plate of optical glass has a thickness of less than or equal to 0.5 millimeters.

24. The method of claim 17, further comprising:
affixing the focal element to the sensor array to cover at least the first imaging region of the sensor array.

25. The method of claim 17 wherein positioning a focal element comprises positioning a focal element over the first imaging region of the sensor array, and the first imaging region of the sensor array and the second imaging region of the sensor array have the same two-dimensional area.

26. The method of claim 17 wherein positioning a focal element comprises positioning a focal element over the first imaging region of the sensor array, and the first imaging region of the sensor array and the second imaging region of the sensor array have different two-dimensional areas.

27. The method of claim 17, further comprising:
positioning one or more fixed light reflecting surfaces in optical alignment with the optical system to direct light from a first read volume along a first path to the optical system and the first imaging region of the sensor array, and to direct light from a second read volume along a second path to the optical system and the second imaging region of the sensor array.

28. The method of claim 27 wherein positioning one or more fixed light reflecting surfaces comprises positioning one or more fixed light reflecting surfaces in optical alignment with the optical system to direct light from a first read volume along a first path to the optical system and the first imaging region of the sensor array, and to direct light from a second read volume along a second path to the optical system and the second imaging region of the sensor array, at least a portion of the first read volume and at least a portion of the second read volume overlap each other to form an overlapping read volume.

29. The method of claim 17 wherein positioning a focal element comprises producing the first image focus distance and second image focus distance, and the first image focus distance has an associated first depth of field and the second image focus distance has an associated second depth of field, the first depth of field overlaps with the second depth of field to provide an overlapping depth of field greater than the first depth of field and the second depth of field.

30. The method of claim 17 wherein positioning a focal element comprises positioning a focal element between the sensor array and the optical system such that at least some of the rays arrive at the sensor array from the optical system through the focal element, the focal element produces a third image focus distance for rays detected by a third imaging region of the sensor array, the third image focus distance different from the first image focus distance and the second image focus distance.

31. The method of claim 17 wherein positioning a two-dimensional sensor array comprises positioning a two-dimensional sensor array that comprises one of a charge-coupled device (CCD) sensor array or complementary metal-oxide-semiconductor (CMOS) sensor array.

32. A machine-readable symbol reader, comprising:
a sensor array;
an image-side telecentric lens assembly optically aligned with the sensor array along an optical axis to direct light rays reflected from an object toward the sensor array; and
a focal element disposed between the image-side telecentric lens assembly and the sensor array such that at least some of the light rays from the image-side telecentric lens assembly arrive at the sensor array through the focal element onto a first imaging region of the sensor array and at least some of the light rays from the image-side telecentric lens assembly that arrive at the sensor array concurrently with the at least some of the rays that pass through the focal element arrive at the sensor array onto a second imaging region of the sensor array without passing through the focal element, and the first imaging region of the sensor array does not overlap with the second imaging region of the sensor array.

33. The machine-readable symbol reader of claim 32 wherein the focal element comprises a plate of optical glass.

34. The machine-readable symbol reader of claim 32 wherein the focal element has a thickness of less than one millimeter and an index of refraction greater than 1.3.

\* \* \* \* \*